(12) United States Patent
Solomon

(10) Patent No.: US 6,681,517 B1
(45) Date of Patent: Jan. 27, 2004

(54) FISHING ROD HOLDER

(76) Inventor: Seth Solomon, 105 Mullins Rd., Glenmore, LA (US) 71433

( * ) Notice: Subject to any disclaimer, the term of this patent is extended or adjusted under 35 U.S.C. 154(b) by 0 days.

(21) Appl. No.: 10/321,260

(22) Filed: Dec. 17, 2002

(51) Int. Cl.[7] ............................................. A01K 97/10
(52) U.S. Cl. ...................................................... 43/21.2
(58) Field of Search ........................... 43/21.2, 23, 17; 248/511, 512, 514, 518, 534, 535, 536, 538, 537, 539, 540

(56) References Cited

U.S. PATENT DOCUMENTS

| | | | | |
|---|---|---|---|---|
| 339,976 A | * | 4/1886 | Deitz | 280/143 |
| 1,162,608 A | * | 11/1915 | Hohl et al. | 248/514 |
| 1,523,042 A | * | 1/1925 | Thomas | 248/537 |
| 1,551,719 A | * | 9/1925 | Williams | 248/512 |
| 2,495,972 A | * | 1/1950 | Johnson | 248/539 |
| 2,848,117 A | * | 8/1958 | Miller | 211/107 |
| 2,899,155 A | * | 8/1959 | Rogers | 248/514 |
| 3,151,910 A | * | 10/1964 | Larson | 297/344.22 |
| 3,747,881 A | * | 7/1973 | Akamu | 248/514 |
| 4,106,811 A | * | 8/1978 | Hernandez | 297/188.09 |
| 4,176,819 A | * | 12/1979 | Lowe | 248/513 |
| 4,581,840 A | * | 4/1986 | Guith, II | 43/21.2 |
| 4,603,500 A | * | 8/1986 | Harrison, Sr. | 43/21.2 |
| 4,637,156 A | * | 1/1987 | Simmons | 43/21.2 |
| 4,645,167 A | * | 2/1987 | Hardwick | 248/520 |
| 4,746,253 A | * | 5/1988 | Simmons | 43/17 |
| 4,953,318 A | * | 9/1990 | Vasseur, Jr. | 43/21.2 |
| 4,964,233 A | * | 10/1990 | Benson et al. | 43/17 |
| 5,025,584 A | * | 6/1991 | Butterwick, Sr. | 43/21.2 |
| 5,033,223 A | * | 7/1991 | Minter | 43/21.2 |
| 5,269,088 A | * | 12/1993 | Slaback et al. | 43/17 |
| 5,571,227 A | * | 11/1996 | Pisarek | 43/21.2 |
| 5,657,883 A | * | 8/1997 | Badia | 211/70.8 |
| 5,673,507 A | * | 10/1997 | Stokes, Jr. | 43/21.2 |
| 5,813,163 A | * | 9/1998 | Dysarz | 43/21.2 |
| 5,829,731 A | * | 11/1998 | Dean | 248/538 |
| 5,987,804 A | * | 11/1999 | Shearer et al. | 43/21.2 |
| 6,047,491 A | * | 4/2000 | De Busk | 43/21.2 |

* cited by examiner

Primary Examiner—Charles T. Jordan
Assistant Examiner—Jordan Lofdahl
(74) Attorney, Agent, or Firm—Keaty Professional Law Corporation

(57) ABSTRACT

A fishing rod holder for mounting on a pedestal of and under a seat of a fishing chair carried by a deck of a boat. The fishing rod holder provides for retaining one or more fishing rods in a variety of angularly oriented positions, such a storage position and a position where the fishing lines are cast in the water. The holder is formed as an open frame defined by a top plate, a parallel bottom plate and a pair or more side plates extending between the top plate and the bottom plate. Openings in the top and bottom plates allow sliding of the holder on the pedestal of the fishing chair. Tubular members are secured on angular braces connecting the top plate(s) with the side plates. The tubular members receive ends of fishing rod handles when the fishing rods are oriented in the operational position.

19 Claims, 5 Drawing Sheets

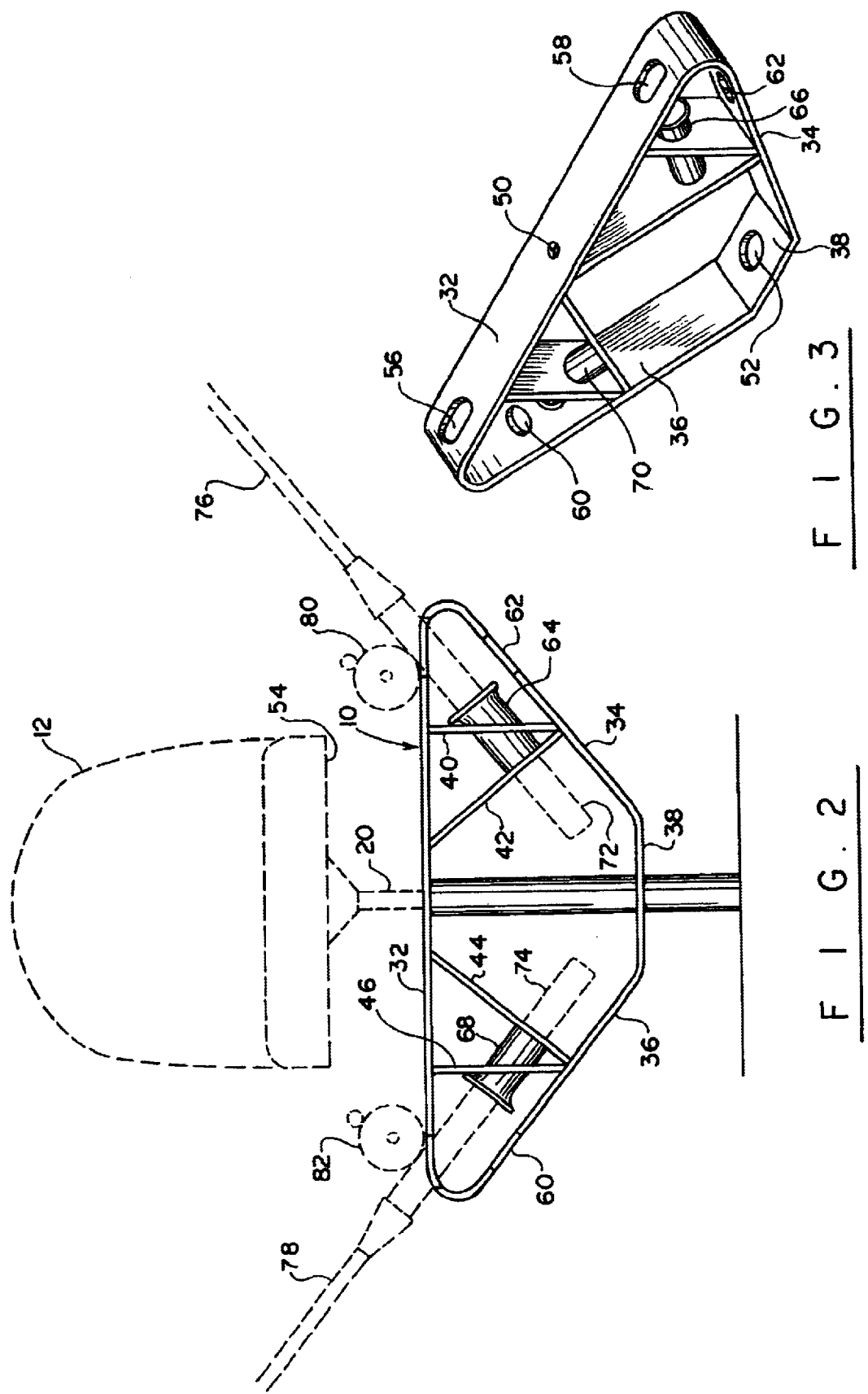

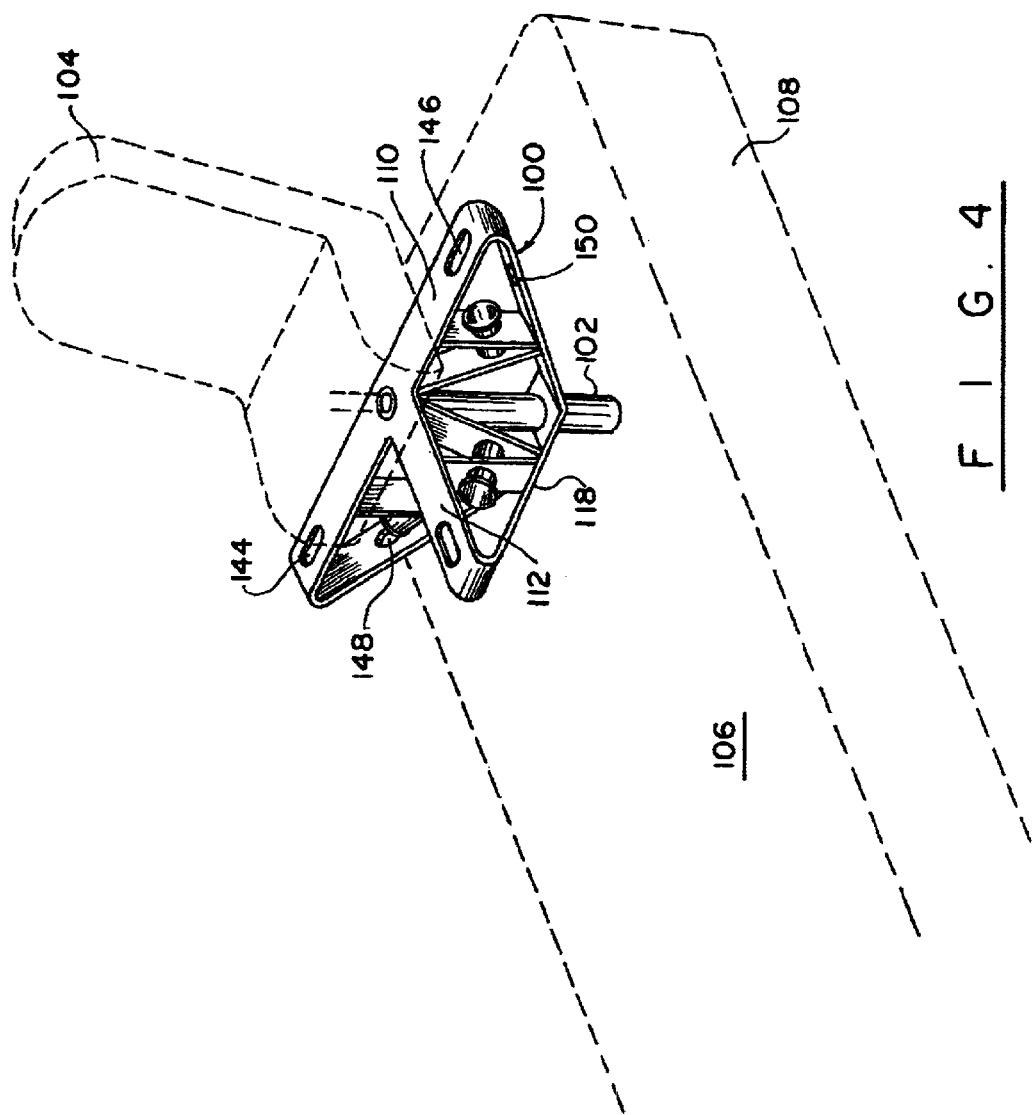

FISHING ROD HOLDER

BACKGROUND OF THE INVENTION

This invention relates generally to a fishing rod holder mounted on a boat, from which a fisherman conducts a fishing operation and, more particularly, to a multiple-rod holder positioned on a pedestal of a standard fishing chair.

Sometimes a fisherman needs to hold the fishing rod and repeatedly cast the line out into the water and retrieve the line numerous times. In other types of fishing, the sportsman does not have to hold onto the fishing rod at all times, but may leave the rod in a stable position on shore or on the boat, waiting for the fish to bite. The present invention is directed to the second method of fishing, wherein the fisherman leaves the rod in place, allowing the fisherman to operate with several rods at a time.

Some of the known fishing rod supports or holders are mounted by an anchoring device, such as a spike, on a bank of a river. Other supporting rod holders are mounted on a deck of a boat or on the side of the boat by clips and other securing means. In other types of fishing, particularly big game fishing, a sportsman uses one or more fishing chairs mounted on the stern or aft portion of the deck of a boat, from which the fisherman casts the line overboard.

However, when a fishing rod is supported by a side of the boat, the fisherman has to repeatedly bend and stoop to check on the line to retrieve the fish. The bending action when performed repeatedly, causes strain on the back muscles and unnecessarily tires the sportsman. The present invention contemplates elimination of drawbacks associated with the prior art and provision of a multi-rod fishing rod holder that can be mounted on the pedestal of a standard fishing chair and that can position the rods in an easily accessible positioned for a sportsman fishing from the deck of a boat.

SUMMARY OF THE INVENTION

It is, therefore, an object of the present invention to provide a multiple fishing rod holder that can be mounted on the pedestal of a fishing chair on the deck of a boat.

It is another object of the present invention to provide a fishing rod holder that is freely rotatable about the central axis of the chair pedestal.

It is a further object of the present invention to provide a multiple fishing rod holder that allows the fisherman to secure the fishing rods at about the level of a fishing chair seat.

It is still a further object of the present invention to provide a fishing rod holder that can be easily positioned and removed, when not needed, from the boat by sliding the fishing rod holder off the pedestal.

It is still a further object of the present invention to provide a fishing rod holder that allows multiple-angle positioning of the fishing rods in the holder during storage and active use of the fishing rods.

These and other objects of the present invention are achieved through a provision of a fishing rod holder for retaining one or more fishing rods in a plurality of positions. One of the positions allows to retain fishing rods in a generally vertical orientation, and another position allows to retain the fishing rods at an angular position, when the fishing lines are cast in the water.

The fishing rod holder is formed as an open frame defined by a top plate, a parallel bottom plate and side plates extending an acute angle between the top plate and the bottom plate. One of the embodiments provides for an elongated top plate, and another embodiment provides for a T-shaped top plate having a transverse top plate member.

The top plate(s) have openings adjacent ends thereof for receiving a fishing rod handle. Corresponding openings are formed in the side plates to allow retaining of the fishing rod handles and the fishing rods positioned in the openings in a generally vertical orientation.

To allow angular positioning of the rods, the invention provides for distinct embodiments. One of the embodiments provides for the use of loop members secured on the side plates. The handles of the fishing rods, retained in the loop members extend in at an acute angle to the top plate, allowing the fishing lines to extend overboard of a boat.

Another embodiment of the invention provides for a plurality of angular braces secured between the top plate and the side plate and for a tubular member carried by the angular braces. When the fishing rod handle is extended through the top plate opening and into the tubular member, the fishing rod becomes oriented at an acute angle in relation to the top plate, allowing the fishing line to be cast for fishing.

The fishing rod holder of the present invention brings the handle of the fishing rod to a level slightly below the knee level of a sportsman seated in the fishing chair on deck of the boat. No excessive bending or stooping is needed to manipulate the fishing rods. The fishing rod holder rotates about the pedestal allowing easy access to the fishing rods retained in the holder.

BRIEF DESCRIPTION OF THE DRAWINGS

Reference will now be made to the drawings, wherein like parts are designated by like numerals, and wherein

FIG. 2 is a front view of a fishing rod holder in accordance with the first embodiment of the present invention.

FIG. 3 is a perspective view of the fishing rod holder of the first embodiment of the present invention.

FIG. 4 is a perspective view of the fishing rod holder of the second embodiment of the present invention for three fishing rods.

DETAILED DESCRIPTION OF THE PREFERRED EMBODIMENTS

Figure 1:
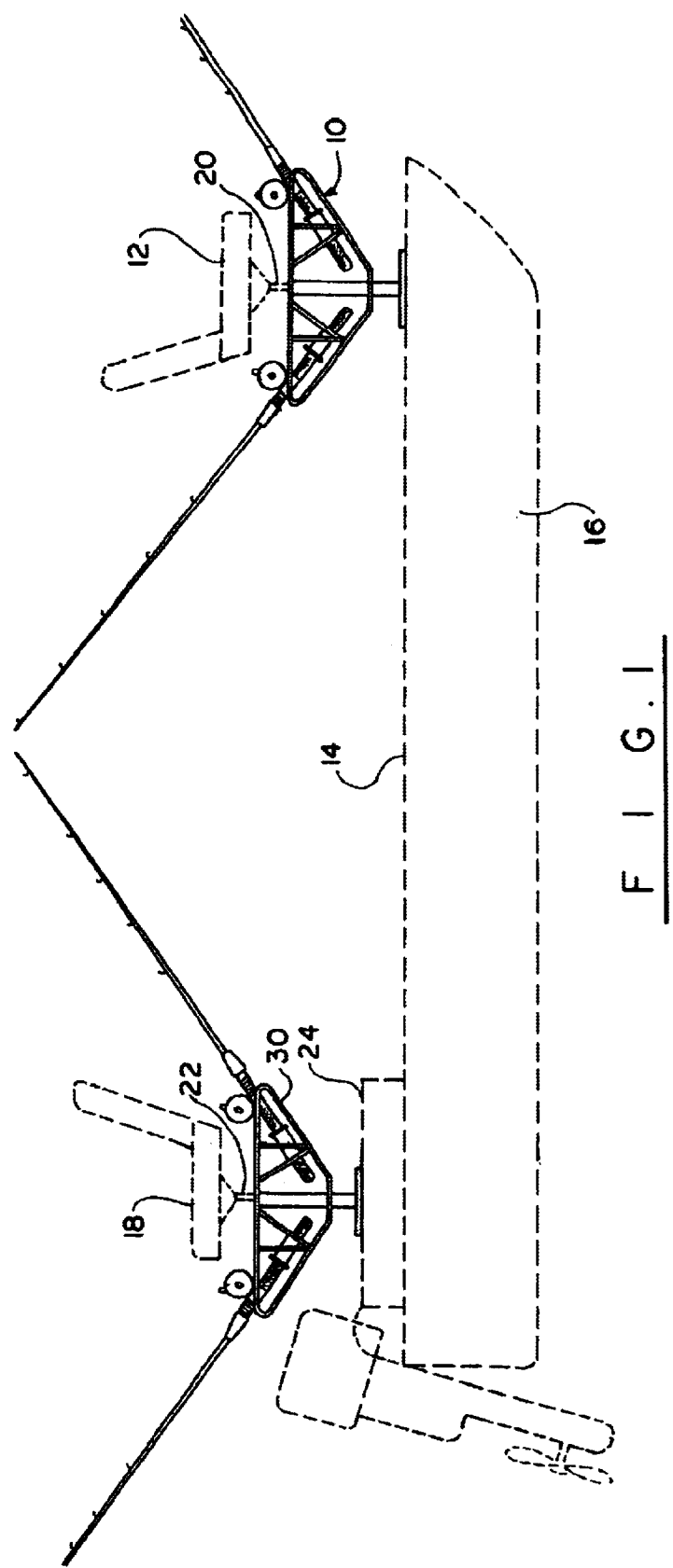
FIG. 1 is a perspective view of a fishing rod holder in accordance with the first embodiment of the present invention positioned on the pedestals of fishing chairs mounted on the stern and bow of a boat.

Turning now to the drawings in more detail, numeral 10 designates the fishing rod holder in accordance with the first embodiment of the present invention. Left and right references are used as a matter of convenience and are determined by standing in front of a fishing chair facing the seat portion and the rod holder mounted below the seat. As shown in FIG. 2, a fishing chair 12 may be mounted on a bow portion of a deck 14 of a boat 16. A similar fishing chair 18 may be mounted at the aft, or stem portion of the deck 14, if desired. The rod holders 10 can be selectively positioned at the aft or bow portion of the boat.

Conventionally, a chair support pedestal 20 is bolted to the deck 14. In some cases, a fishing chair pedestal, such as pedestal 22 is mounted on a support platform 24 and is bolted thereto. In such a case, the support platform 24 is fixedly mounted on the deck 14. The fishing chairs 12 and 18 are rotationally mounted on the respective pedestals 20 and 22 to permit the chairs 12 and 18 to freely rotate about a vertical axis formed by the pedestals 20 and 22. Also conventionally, the chairs 12 and 18 are slideably engaged with the pedestals 20 and 22 and can be easily lifted therefrom when desired. The fishing rod holders 10 and 30 mounted below the chairs 12 and 18 can be rotated to a convenient potion about the axis of the pedestals 20 and 22 as will be descried in more detail hereinafter.

Turning now to the first embodiment of the present invention shown in FIGS. 2 and 3, a fishing rod holder 10 comprises an open frame formed by a plurality of connected plates and braces. The holder 10 comprises a top plate 32, a right, or first inclined plate 34 and a left or second inclined plate 36. The plates 34 and 36 converge to a bottom plate 38, which extends in a parallel relationship to the top plate 32, as can be better seen in FIG. 2. The plates 34 and 36 extend at an acute angle in relation to the top plate 32 and an obtuse angle in relation to the bottom plate 38.

A first inclined, or angular connecting brace 40 extends downwardly from the top plate 32 at a substantially right angle thereto and connects with the plate 32 at the bottom section thereof. A second inclined, or angular connecting brace 42 extends from the top plate 32 to the right plate 34 and is secured thereto adjacent to the point of the attachment of the first connecting brace 40. The second connecting brace 42 extends at about 90-degree angle in relation to the second plate 34.

A third inclined, or angular connecting brace 44 extends at an angle similar to the angle of the second connecting brace 42, from about midsection of the left plate 36 to the bottom surface of the top plate 32. A fourth inclined, or angular connecting brace 46, similarly to the first connecting brace 40, extends from the top plate 32 to about mid section of the side plate 36; it is attached to the side plate 36 adjacent a line of attachment of the third connecting brace 44. The fourth connecting brace 46 extends at a right angle from the bottom of the top plate 32.

As can be better seen in FIG. 2, the front view of the holder 10 presents an upturned truncated triangular shape, with the length of the bottom plate 38 being considerably smaller than the length of the top plate 32.

A central opening 50 is formed in the top plate 32. A vertically aligned central opening 52 is formed in the bottom plate 38. The openings 50 and 52 allow the frame of the holder 10 to be slideably mounted on the pedestal 20, by allowing the pedestal 20 to pass through the opening 52 and then through the opening 50 and extend upwardly from the top plate 32. When mounted on the pedestal 20, the holder 10 and the top plate 32 thereof are located below the bottom 54 of the chair 12. The holder 10 does not prevent rotational movement of the chair 12 about the central axis defined by the pedestal 20. In fact the fishing rod holder of the present invention can rotate about the pedestal together with the fishing chair or independently of the chair.

A pair of elongated oval openings 56 and 58 is formed through the top plate 32 adjacent opposite ends thereof. A corresponding opening 60 is formed in the left plate 36 in slight misalignment to the opening 56. A corresponding opening 62 is formed in the right plate 34 in a slight misalignment to the opening 58. When a handle of a fishing rod is inserted through the openings 56 and 60 or through openings 58, 62, the fishing rod is oriented almost vertically, or at a slight angle to the vertical in relation to the deck 14. Such orientation can be better seen in FIG. 5. The openings 56, 58, 60, and 62 allow "storage" positioning of the fishing rods within the holder 10.

A first tubular sleeve 64 is mounted within the frame of the holder 10, between the first connecting brace 40 and the second connecting brace 42 . The tubular sleeve 64 extends through an opening 66 formed in the connecting brace 40 (FIG. 3) and at the second connecting brace 42. A similar tubular sleeve 68 extends between the third and fourth connecting braces 44 and 46, respectively. The sleeve 68 extends through an opening 70 formed in the fourth connecting brace 46 and terminates at the third connecting brace 44. Suitable openings are made in the second and third connecting braces 42 and 44 to allow at least portions of fishing rod handles 72 and 74 to extend therethrough.

When the rods 76 and 78 are positioned within the tubular sleeves 64 and 68, their handles 72 and 74 extend in a generally parallel orientation to the right plate 34 and the left plate 36, as shown in FIG. 2. The distant ends of the handles 72 and 74 extend through the openings 58 and 56, retaining the handles in a desired angular position. Fishing line reels 80 and 82, shown in phantom lines in the drawings rest on top of the top plate 32 when the rods 76 and 78 are engaged in the holder 10.

In this manner, the rods 76 and 78 do not slide through the openings defined by the holder 10 but are safely retained in the convenient angular relationship within the holder 10. In this position, the lines carried by the rods 76 and 78 can be cast overboard, leaving the fisherman's hands free and not requiring the fisherman to bend while holding the rod. When the fish strikes, the fisherman, sitting in the chair 12 can easily retrieve the rods 76 or 78 from their respective tubular sleeves 64 and 68 and remove the caught fish from hook.

Figure 6:
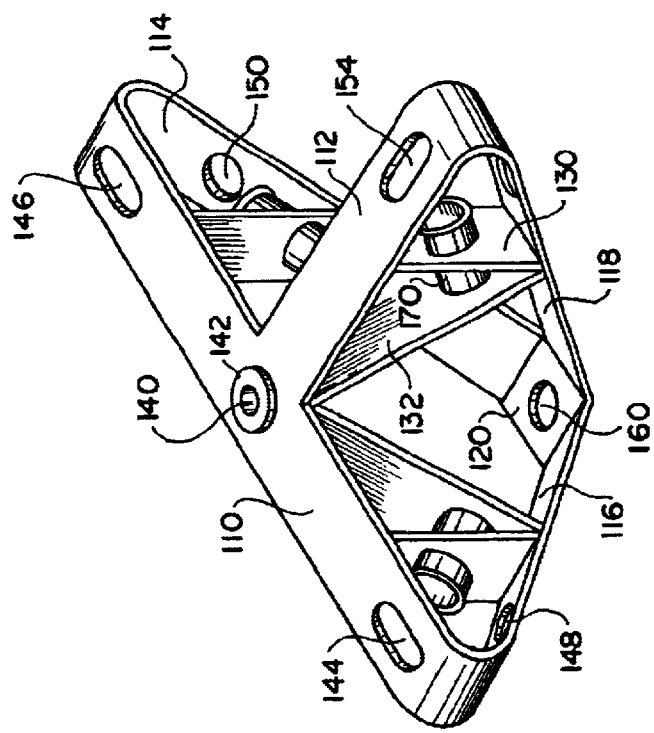
FIG. 6 is a perspective view of the fishing rod holder of the second embodiment of the present invention.
Figure 5:
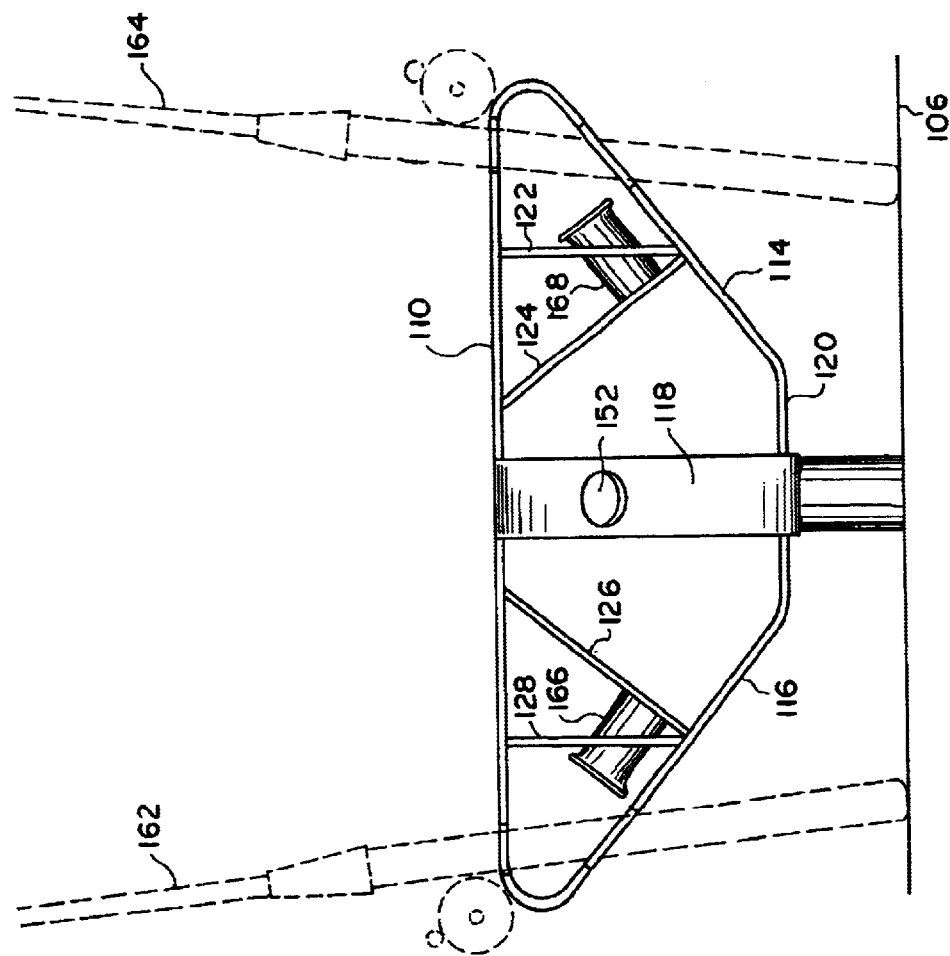
FIG. 5 is a front view of the second embodiment of the present invention showing positioning of the fishing rods in a generally vertical orientation.

Turning now to the second embodiment of In the present invention, illustrated in FIGS. 4, 5 and 6, the fishing rod holder 100 is shown mounted on a pedestal 102 of a fishing chair 104. The chair 104 is secured on a deck 106 of a boat 108 shown schematically in FIG. 4. The second embodiment of the present invention allows a sportsman to retain three fishing rods within the holder 100. In this embodiment, the holder 100 comprises a first elongated top plate 110 and a transverse top plate member 112 extending at a right angle to the first top plate 110 to a mid portion thereof. The top plates 110 and 112 form a T-shaped configuration, as can be seen in FIGS. 4 and 6.

Connected to the top plate 110 is a right inclined side plate 114. Connected to the top plate 110 is a second, or left, side plate 116. A third side plate 118 is connected to the transverse top plate member 112, extending downwardly from the plate 112 to a bottom plate 120 which also serves as a point of connection of the converging plates 114 and 116. The bottom plate 120 extends in a parallel relationship to the first top plate 110 and transverse top plate member 112.

Similarly to the first embodiment shown in FIGS. 2 and 3, the second embodiment provides for the use of angular connecting braces for each "corner" of the frame 100. A first connecting brace 122 extends at a right angle downwardly from the plate 110 to a mid-portion of the right plate 114. A second connecting brace 124 extends from the bottom of the top plate 110 to the point of attachment of the connecting brace 122 forming a V-shaped configuration between the plates 110 and 114. A third angular connecting brace 126 extends at an angle similar to the angle of the second connecting brace 124, and a fourth connecting brace 128 extends between the plates 110 and 116 at an angle similar to the angle of the brace 122. A fifth connecting brace 130 extends between the plates 112 and 118 and a sixth connecting brace 132 extends at an angle, similar to the angle of the plates 124 and 126 between the plate 112 and the side plate 118.

A central opening 140 is made through the top plate 110. The opening 140 may be protected by an insert or liner 142 secured on top of the plate 110, if desired. A pair of elongated, oval-shaped openings 144 and 146 are formed adjacent left and right ends of the top plate 110. A corresponding opening 148 is formed in a general alignment to the opening 144 and the plate 116. A corresponding opening 150 is also formed in the right plate 114 in a general alignment with the opening 146. A third circular opening 152 is formed in the plate 118 in general alignment with a elongated oval opening 154 formed in the distant portion of the transverse top plate 112.

To position the holders 10 and 100, the user lifts the fishing chair off the pedestal and slides the holder onto the pedestal. When the holder 100 is positioned on the pedestal 102 of the fishing chair 104, the pedestal 102 extends through the opening 160 formed in the plate 120 and through the opening 140 formed in the top plate 110. The chair 104 is then repositioned on the pedestal 102 in the usual manner.

When the fishing rods 162 and 164 are placed in the holder 100 by extending the handle through the respective openings 144, 148 and 146, 150, the rods 162 and 164 appear to be oriented almost perpendicularly to the deck 106 of the boat 108. After the line has been cast, the fisherman places the rods 162 and 164 so that their handles extend through the openings 144 and into a tubular sleeve 166. The rod 164 is positioned to have its handle extend through the opening 146 and into the second tubular sleeve 168.

A third tubular sleeve 170 is secured to the inclined braces 130 and 132 as can be better seen in FIG. 6. The third rod, if desired, may be positioned to extend through the opening 154 and into the sleeve 170 allowing the rods 162 and 164 and the third rod (not shown) to be cast overboard. In such a case, the chair 104 is turned to face the stern or bow of the boat 108, allowing the cast line from the fishing rod secured with the sleeve 170 to extend over the hull of the boat 108.

If desired, the tubular sleeves 64, 68, 166 and 168, 170 can be made with flared out entry openings to facilitate positioning of the handles of the fishing-rods therein without damaging the handles during positioning and removal. In both cases, the reels of the fishing rods prevent the rods from slipping through the openings in the holders 10 and 100.

Figure 7:
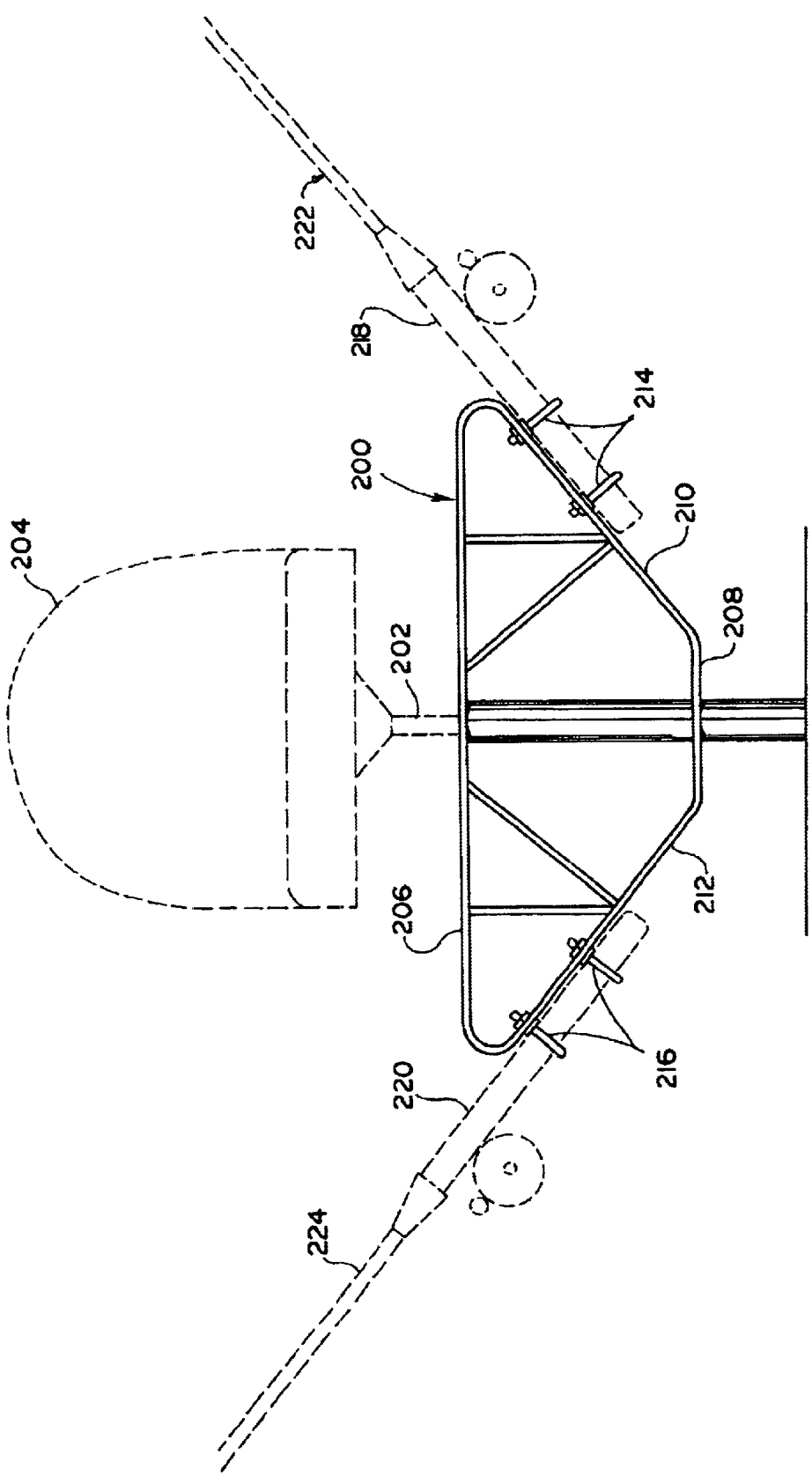
FIG. 7 is a front view of a fishing rod holder according to the third embodiment of the present invention with the fishing rods oriented for casting the line over the boat side.

Turning now to the embodiment shown in FIG. 7, a fishing rod holder 200 is shown mounted on the pedestal 202 supporting a fishing chair 204. The holder 200, similarly to the holder 10 comprises an open frame assembly and a generally inverted triangular truncated configuration. The holder 200 has a top plate 206, a bottom plate 208, extending in a parallel relationship to the plate 206 and a pair of side plates 210 and 212. One or more U-shaped clips, or loop members 214 are secured to the right plate 210. One or more U-shaped clips, or loop members 216 are secured to the inclined plate 212. The clips 214 and 216 may be secured by bolts or other similar means of attachment.

The clips 214 and 216 define openings suitable for receiving handles 218 and 220 of the fishing rods 222 and 224, respectively. In this embodiment, the fishing rods are merely slipped into the clips 214 and 216 at an angle defined by the extension of the side plates 210 and 212. In this embodiment, the rods are readily available for casting a line over the board of a boat. If desired, the holder 200 may be provided with openings in the top plate and the side plates to allow the fishing rods to be stored in a generally vertical position when not in use.

The holders 10, 100, and 200 extend at a level above the boat deck to a level somewhat below the fishing chair. In this position, the fishing rods are easily accessible to a sportsman sitting in the chair without the necessity for a fisherman to bend excessively to retrieve or cast a line. By making central openings in the top plate smaller, the holders allow the top plates to rest on top of the section of the chair pedestal without dropping all the way to the deck of the boat, thereby retaining the fishing rods at an elevated position.

The fishing holders of the present invention can be manufactured from any number of materials, such as aluminum or stainless steel that provide sturdy support for the multiple fishing rods while corrosion. The holders for the multiple fishing rods are easily positionable on the pedestal of the chair by a three-step process, according to which a user first removes the fishing chair from the pedestal, slips the holder on the pedestal and then re-positions the chair again on the same pedestal, retaining the fishing rod holders below the seat of the chair and allowing extension of the handles to a level of a seated person.

Many changes and modifications can be made in the design of the present invention without departing from the spirit thereof. I, therefore, pray that my rights to the present invention be limited only by the scope of the appended claims.

I claim:

1. A fishing rod holder, comprising:
   an open frame comprised of a top plate, a bottom plate and at least a pair of side plates integrally connecting the top plate with the bottom plate, said at least pair of side plates extending at an acute angle to said top plate and said bottom plate extending in a substantially parallel relationship to said top plate;
   a plurality of angular braces connecting the top plate with said at least pair of side plates;
   a means carried by said frame for detachably retaining at least one fishing rod on said frame, said retaining means comprising at least one tubular member secured on said angular braces, and wherein said at least one tubular member has open ends and a longitudinal central axis, and wherein said at least one tubular member is oriented with the central axis in a generally parallel relationship to at least one of said at least pair of side plates.

2. A fishing rod holder, comprising:
   an open frame comprised of a top plate, a bottom plate and at least a pair of side plates integrally connecting the top plate with the bottom plate, said at least pair of side plates extending at an acute angle to said top plate and said bottom plate extending in a substantially parallel relationship to said top plate;
   a plurality of angular braces connecting the top plate with said at least pair of side plates;
   a means carried by said frame for detachably retaining at least one fishing rod on said frame, said retaining means comprising at least one tubular member secured on said angular braces, and wherein said top plate is provided with at least one through opening formed adjacent an end of said top plate, and wherein said at least one opening is formed opposite an opening of said at least one tubular member for receiving a handle of at least one fishing rod therein, said at least one tubular member allowing to retain at least one fishing rod in a position generally parallel to the central axis of the tubular member when a handle of said at least one fishing rod is inserted to extend through said at least one opening in the top plate and through said at least one tubular member.

3. A fishing rod holder, comprising:

an open frame comprised of a top plate, a bottom plate and at least a pair of side plates integrally connecting the top plate with the bottom plate;

a plurality of angular braces connecting the top plate with said at least pair of side plates;

a means carried by said frame for detachably retaining at least one fishing rod on said frame, and wherein said top plate is provided with at least one through opening adjacent one end thereof, at least one of said at least pair of side plates is provided with an opening formed opposite said at least one opening formed in the top plate, and wherein said frame allows to retain at least one fishing rod in a generally vertical orientation when a handle of said at least one fishing rod is positioned to extend through said at least one opening in the top plate and the opening in said at least one of said at least pair of side plates.

4. A fishing rod holder, comprising:

an open frame comprised of a top plate, a bottom plate and at least a pair of side plates integrally connecting the top plate with the bottom plate;

a plurality of angular braces connecting the top plate with said at least pair of side plates;

a means carried by said frame for detachably retaining at least one fishing rod on said frame, and wherein said top pate and said bottom plate are each provided with a central opening to allow detachable positioning of said fishing rod holder on a pedestal of a fishing chair.

5. The fishing rod holder of claim 4, wherein said top pate if further provided with a pair of openings formed adjacent opposite ends of said top plate, each of said at least pair of side plates is provided with an opening opposite respective openings formed in the top plate, wherein each of said openings in the top plate and said at least pair of the side plates is sized and shaped to receive a handle of a fishing rod therethrough.

6. A fishing rod holder, comprising:

an open frame comprised of a top plate, a bottom plate and at least a pair of side plates integrally connecting the top plate with the bottom plate;

a plurality of angular braces connecting the top plate with said at least pair of side plates; and a means carried by said frame for detachably retaining at least one fishing rod on said frame, and wherein said angular braces comprises a first connecting brace extending between the top plate and one of said at least pair of side plates, said first connecting brace extending at a right angle to said top plate, said angular braces further comprising a second connecting brace extending between the top plate and one of said at least pair of side plates, said first connecting brace extending at a right angle to said one of said at least pair of side plates and secured to said one of said at least pair of side plates adjacent a point of attachment of said first connecting brace.

7. A fishing rod holder, comprising:

an open frame comprised of a top plate, a bottom plate and at least a pair of side plates integrally connecting the top plate with the bottom plate;

a plurality of angular braces connecting the top plate with said at least pair of side plates; and a means carried by said frame for detachably retaining at least one fishing rod on said frame, and wherein said top plate comprises a first elongated member and a second transverse member unitary connected to and extending from a mid-portion of the first member, and wherein a third side plate extends at an acute angle from said top plate to the bottom plate.

8. A fishing rod holder for mounting on a pedestal of fishing chair secured to a deck of a boat, said fishing rod holder comprising:

a top plate provided with a central opening;

a pair of side plates unitary connected to and extending at an acute angle downwardly from said top plate; and a bottom plate unitary connecting said side plates, said bottom plate being oriented in a generally parallel relationship to said top plate, said bottom plate being provided with a central opening to allow, in cooperation with the top plate central opening, positioning of the fishing rod holder on the pedestal of the fishing chair at a location below a seat of the fishing chair.

9. The fishing rod holder of claim 8, wherein a pair of openings are formed adjacent opposite ends of the top plate, and wherein a respective opening is formed in each of the side plates opposite said top plate opening so as to allow retaining of handles of fishing rods in a generally vertical orientation by said fishing rod holder.

10. The fishing rod holder of claim 8, further comprising a plurality of angular braces extending between the top plate and the side plates.

11. The fishing rod holder of claim 10, wherein a pair of angular braces extends between the top plate and a first side plate, and wherein a pair of angular braces extends between the top plate and a second side plate.

12. The fishing rod holder of claim 11, wherein each pair of the angular braces carries a tubular member for receiving an end of a fishing rod handle therein.

13. The fishing rod holder of claim 12, wherein said tubular member has a central axis oriented in a substantially parallel relationship to a respective side plate, and wherein said tubular member allows orienting the handle of a fishing rod in a generally parallel relationship to the respective side plate.

14. The fishing rod holder of claim 8, further comprising a transverse top plate member extending perpendicularly to a mid-portion of the top plate.

15. The fishing rod holder of claim 14, wherein a pair of openings are formed adjacent opposite ends of the top plate and an opening is formed adjacent a free end of the transverse top plate member, and wherein a respective opening is formed in each of the side plates opposite said top plate opening and said transverse top plate member opening so as to allow retaining of handles of fishing rods in a generally vertical orientation by said fishing rod holder.

16. The fishing rod holder of claim 15, further comprising a plurality of angular braces extending between the top plate, the transverse top plate member and the side plates.

17. The fishing rod holder of claim 16, wherein a pair of angular braces extends between the top plate and a first side plate, a pair of angular braces extends between the top plate and a second side plate, and a pair of angular braces extends between the transverse top plate member and a respective side plate that extends from said transverse top plate member to said bottom plate.

18. The fishing rod holder of claim 17, wherein each pair of the angular braces carries a tubular member for receiving an end of a fishing rod handle therein.

19. The fishing rod holder of claim 18, wherein each of said pair of angular braces comprises a first angular brace attached at a right angle between the top plate and a second angular brace attached at a right angle to the side plate.

* * * * *